B. C. STICKNEY.
COMBINED TYPE WRITING AND COMPUTING MACHINE.
APPLICATION FILED NOV. 2, 1911.

1,177,149.

Patented Mar. 28, 1916.
7 SHEETS—SHEET 2.

Witnesses:
Titus H. Brooks
F. E. Alexander

Inventor
Burnham C. Stickney

B. C. STICKNEY.
COMBINED TYPE WRITING AND COMPUTING MACHINE.
APPLICATION FILED NOV. 2, 1911.

1,177,149.

Patented Mar. 28, 1916.
7 SHEETS—SHEET 3.

B. C. STICKNEY.
COMBINED TYPE WRITING AND COMPUTING MACHINE.
APPLICATION FILED NOV. 2, 1911.

1,177,149.

Patented Mar. 28, 1916.
7 SHEETS—SHEET 5.

UNITED STATES PATENT OFFICE.

BURNHAM C. STICKNEY, OF ELIZABETH, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,177,149.   Specification of Letters Patent.   Patented Mar. 28, 1916.

Application filed November 2, 1911. Serial No. 658,134.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to computing machines, especially to those which are combined with typewriters, and more especially to those of the type illustrated in the Hanson Patents Nos. 905,421 and 905,422, and in the pending application of Frederick A. Hart, No. 466,836, filed Dec. 10, 1908. In this type of machine, numeral keys, which are preferably the same keys that operate the numeral types of the typewriter, are depressed to select or set certain pins of the computing mechanism; and after all the keys are operated for writing a number, a general operator is brought into action to rotate the computing or dial wheels, each to an extent determined by the corresponding pin. These pins are mounted upon bars, and the bars are formed with racks which mesh with pinions associated with the respective dial wheels, the latter loosely mounted upon an arbor.

One of the main objects of the present invention is to enlarge the capacity of the machine without unduly increasing its cost or complicating its mechanism, and another of the main objects is to provide for accumulating separately the grand result of all of the additions or computations performed by a set of computing wheels on this general type of machine.

In one form of my invention I provide two sets of computing wheels, although the invention is not limited to two sets. The wheels in one set are interjacent among those in the other set. I illustrate the wheels as mounted coaxially, those in one set alternating with those in the other set upon a single arbor.

Each of the pin-carrying bars is forked, and each member of the fork has a rack, and these racks engage pinions upon adjacent wheels, so that when the forked rack advances, these wheels are turned; one wheel being in one set and the other wheel being in the other set. Hence the same addition or computation may be performed on two sets of wheels concomitantly.

In said patents and said application, there is illustrated a power-driven driver for the tens-carrying trains of mechanism; this driver being connected to said general operator. I have contrived to cause this driver to operate tens-carrying trains for both sets of computing wheels. In said patents and said application, each dial wheel is provided with a starting tooth which effects a slight advance movement of a tens-carrying train; and said power-driven driver thereupon completes the movement of said train, so that ten is carried to the wheel of next higher denomination.

According to the present improvements, the computing wheels are all provided with starting teeth, and each set of computing wheels has its own set of tens-carrying trains; each train being started by its own associated dial wheel; there being separate trains for all the dial wheels or computing wheels in both sets. The power-driven driver is common to all of the computing trains, however, so that when any computing train in either set has been started by its dial wheel, the power-driven driver will complete the operation of that train. In other words, the two sets of tens-carrying mechanism ramify from the power-driven driver to the two sets of computing wheels which are mounted alternately upon a single arbor.

In order to render it convenient to read the interjacent dial wheels, that is, to distinguish the number indicated by one set of wheels from the number indicated by the other set of wheels, I provide a cover plate for all the wheels, and there is arranged in the cover plate an individual sight opening for each wheel. The sight openings for one set of wheels have a staggered relation to the sight openings for the other set of wheels; or in other words, there is an upper row of openings through which one set is to be read, and a lower row of openings through which the other set is to be read.

The starting pins of the tens-carrying mechanisms are so placed, that when any wheel is moving to bring the zero thereon to view, its starting pin initiates the tens-carrying operation; and the provision of individual holes in the cover plate enables the wheels in either set to be readily read.

Other features and advantages will hereinafter appear.

In the accompanying drawings, Fig. 5ª shows means for enabling one set of adding wheels to be set to zero. Fig. 8ª is a sectional view, and Fig. 8ᵇ is an elevation of a unit comprising a dial wheel, a driving pinion and an intervening pawl and ratchet.

In said machine, alphabet keys 1 and numeral keys 2 depress levers 3 to operate bell cranks 4, to swing type bars 5 up to strike against the front of a platen 6, which is mounted on a carriage 7, propelled by a spring barrel 8 and controlled by an escapement wheel 9 and dogs 10, the latter operated by a universal bar 11 mounted on a reciprocating frame 12, which is carried at its rear end by idle links 13; said universal bar being operated by heels 14 on the type bars. Said keys have stems 15 to depress arms 16 on rock shafts 17, which form parts of linkages 18; said linkages also including horizontal bars 19, which extend horizontally across the machine to enable the keys to depress any of a nest of computation pins 20. Said pins 20 are carried upon bars 21, which operate the dial wheels; there being one bar 21 for each denomination.

The carriage 7 of the typewriter selects or determines the denomination in which computing is to be done upon the depression of any numeral key. For this purpose, the carriage carries a dog 22 to engage and cam up or lift any of a series of jacks 23, which are pivoted at 24, and at their rear ends depress rods 25, the latter connected by levers 26 to linkages which lift the rear ends of the bars 21; each jack 23 being connected with its own bar 21, so that the position of the carriage 7 determines which one of said bars 21 shall lie in elevated position at the depression of any numeral key 2.

Figure 12:
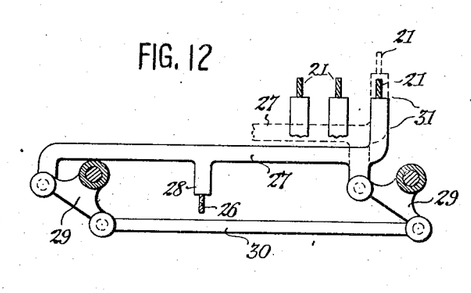
Fig. 12 is a sectional rear elevation of the linkages, whereby the carriage lifts the rear ends of the rack bars, thus determining the denominations of the pins set by the key.
Figure 13:
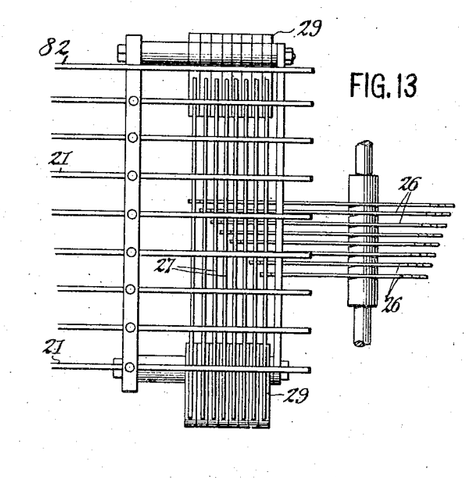
Fig. 13 is a plan of said linkages.

Each bar-lifting linkage comprises a link 27, Figs. 12 and 13, having an appendage 28, which is engaged by the corresponding lever 26 to lift the link, which extends across the machine and is pivoted at its ends upon bell cranks 29, which are also connected by an idle link 30. Each link 27 is formed with a lifter 31 to raise the bar 21 from the full line to the dotted line position at Fig. 12, to enable the pins 20 thereon to be reached and depressed by the key operated links or bars 19. The links 27 and 30 are longer than shown in said Hart application, to accommodate the increase in the width of the system of bars 21 illustrated in the drawings.

The dial or computing wheels, which are operated by the bars 21, are arranged in two sets, those in one set being marked 32, and those in the other set being marked 33; the wheels in both sets being loose upon an arbor 34. To each computing wheel 32 a pinion 35 is loosely connected by means of a ratchet wheel 36 and pawl 37, as usual, Figs. 8ª and 8ᵇ; and in mesh with each pinion 35 is an operating rack 38, said rack being formed on or rigid with the bar 21, aforesaid, whereby, when the bars 21 are driven forwardly, in the usual manner presently to be explained, these dial wheels 32 will be rotated, each to an extent determined by the position of the set pin 20 on its bar 21.

Figure 10:
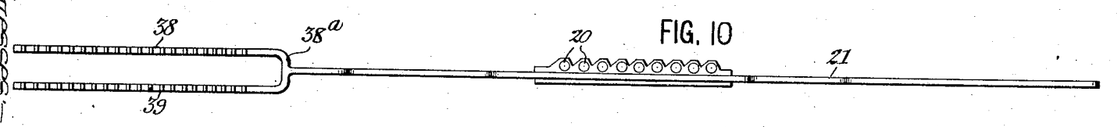
Fig. 10 is a plan and Fig. 11 an elevation of one of the forked racks.
Figure 11:
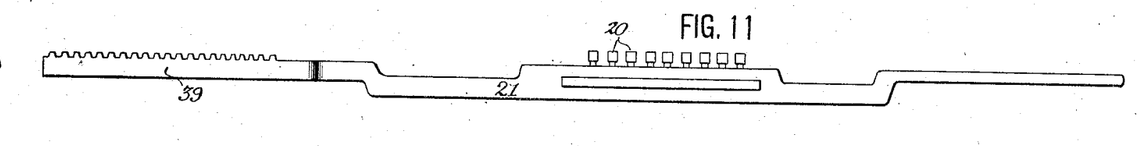

It will be noticed at Figs. 10 and 11 that each bar 21 is forked at 38ª at its forward end, one member of the fork having the rack 38, and the other member having a similar rack 39; and these racks 39 engage pinions 40, which have ratchet and pawl connections with the dial wheels 33, similar to those which connect the pinions 35 with the dial wheels 32. Hence at the operation of any bar 21, two dial wheels are rotated, one dial wheel 32 belonging in one set, and the adjacent dial wheel 33 belonging in the other set; the dial wheels of one set alternating or lying interjacent with those in the other set, as seen clearly at Fig. 6.

Figures 7, 8, 8A, 8B, 9:
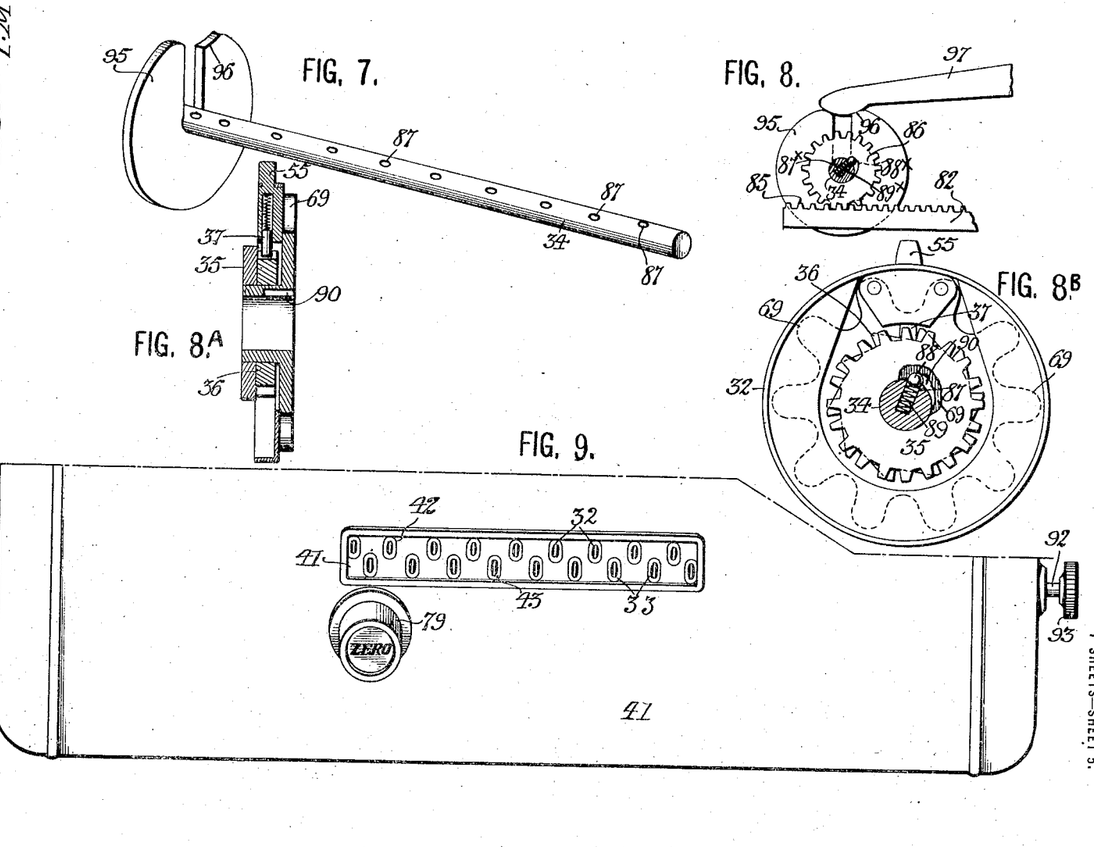
Fig. 7 is a perspective view of an arbor upon which all of the dial wheels are mounted; said arbor having means for clutching it to the computing wheels of one head or set so as to return them to zero.
Fig. 8 is a sectional elevation showing a portion of the zero mechanism including the arbor and disk seen at Fig. 7.
Fig. 9 is a plan of the forward portion of the computing machine base showing particularly the arrangement of individual sight holes thereon in upper and lower rows.

At Fig. 9 is illustrated a method in which readings can be taken from both sets of wheels; there being a cover plate 41 for the wheels, and said plate having two rows of individual sight openings; the upper row of openings being marked 42, through which may be read the number on the wheels 32, and the lower row of openings being marked 43, through which may be read the number indicated by the lower set or gang of computing wheels 33.

Figure 6:
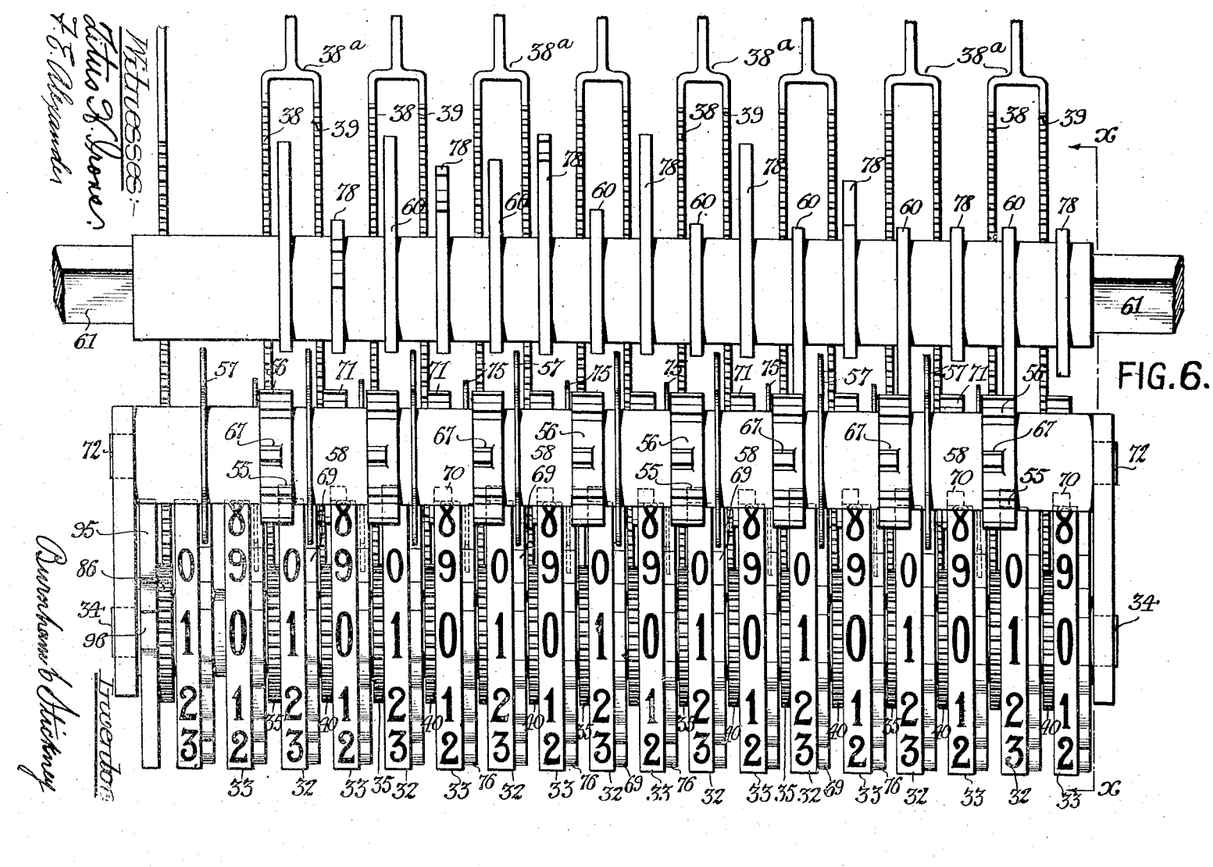
Fig. 6 is a plan on an enlarged scale of the dial wheels and tens-carrying trains.

At Fig. 6 all of the wheels are shown in zero positions; and it will be seen that the zeros on the wheels have staggered relation; or in other words, the zeros on the wheels 32 are advanced a single point beyond the zeros on the wheels 33. It will be perceived that the portions of the cover plate between the openings in each row, cover the wheels which intervene between said openings, so that the wrong numbers cannot be read therefrom. The actuation of the rack bars 21 is the same as heretofore; the general operator being driven by a crank 44 or otherwise, and comprising a pair of racks 45, 46, to which a shaft 47 of said crank is connected by segments 48 fixed on said shaft, and idle pinions 49 intervening between said segments and said racks 45 and 46. The racks are connected by horizontal cross bars 50, 51. The bar 50, as usual, engages any of the pins 20 which have been depressed by the keys; and accordingly the racks are driven forward and the computing wheels in both sets rotated. The return movement of the general operator may be caused or assisted by a spring 52, Fig. 1; and the cross bar 51 of the general operator may engage lugs 53 pendent from the bars 21 to drive the latter backward to normal positions; all the dial wheels in both sets remaining motionless while this is done being held by spring detents 54, and the pinions 35, 40 being permitted to rotate idly in return directions by reason of their pawl and ratchet connections to the dial wheels.

Figures 14, 15, 16, 17, 18:
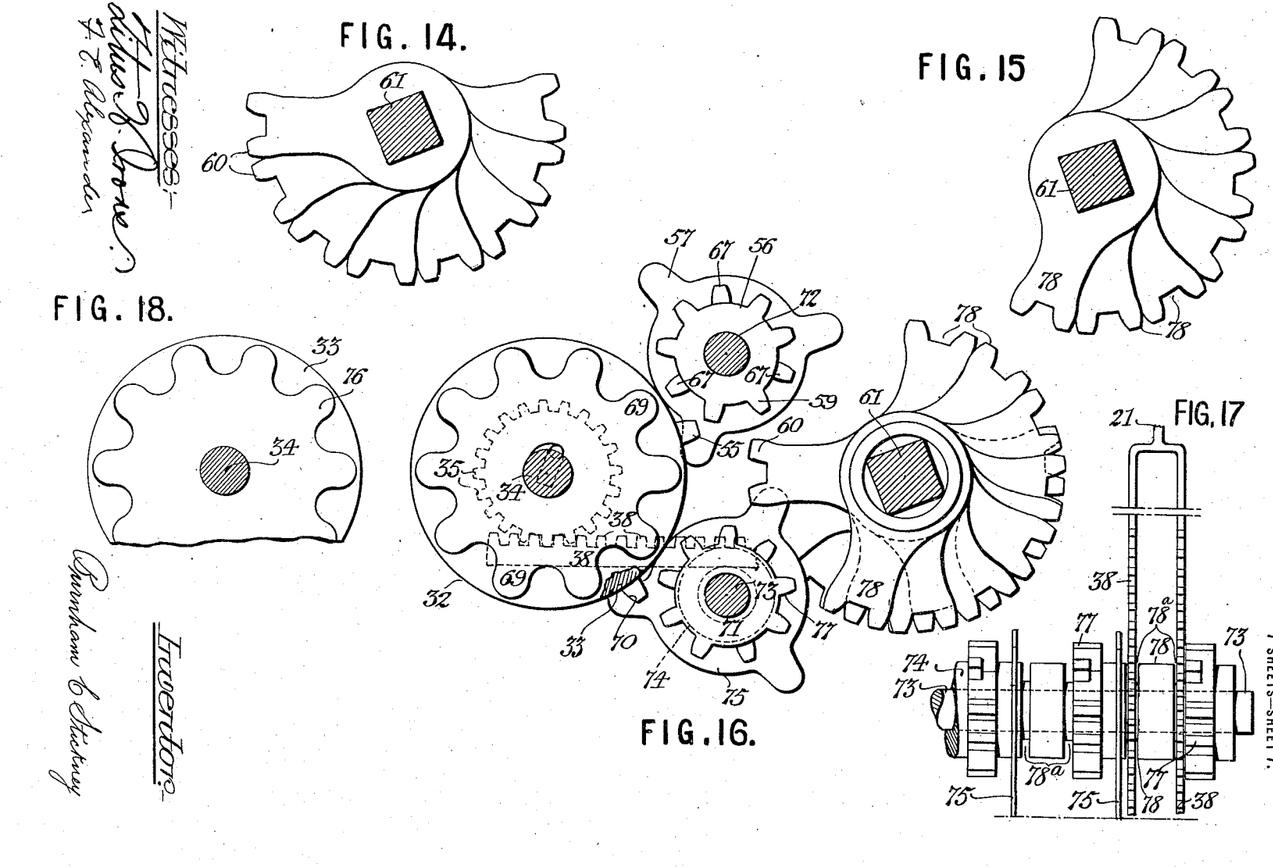
Fig. 14 is a sectional elevation of one set of segments or teeth carried upon a power-driven revoluble shaft, adapted to operate one set of tens-carrying trains.
Fig. 15 is a view of another set of segments or teeth on the same shaft adapted to operate the other set of tens-carrying trains. The sets at Figs. 14 and 15 are shown separately for clearance, but it will be understood that these gears are alternating or interjacent, as seen at Fig. 16.
Fig. 16 is a sectional side elevation of the dial wheels, tens-carrying trains and power-driven driver therefor.
Fig. 17 is a fragmentary plan to show how the racks rest in grooves formed in the hubs of the lower tens-carrying trains.
Fig. 18 shows the computing wheel in one of the sets.

Referring now to the dial or computing wheels 32, it will be seen that each one thereof has a starting tooth 55, Fig. 16, projecting from its periphery to engage and start a pinion 56, which, with a three-toothed wheel 57 fixed thereto, forms a train for carrying tens to the wheel 32 of next higher denomination; each pinion 56 being connected to its three-toothed wheel 57 by a hub 58, which is elongated to pass by the intervening dial wheel 33 of the other set; tens being carried from wheel to wheel upon one set of dial wheels independently of the other set of dial wheels, thereby permitting accumulation on one set of the results of all the computations performed upon the other set, since the wheels in either set may be returned to zero without disturbing those in the other set, and since from that point new numbers can be added concomitantly on both sets, thus giving on one set the aggregate of all the additions performed upon the other set.

Figure 3:
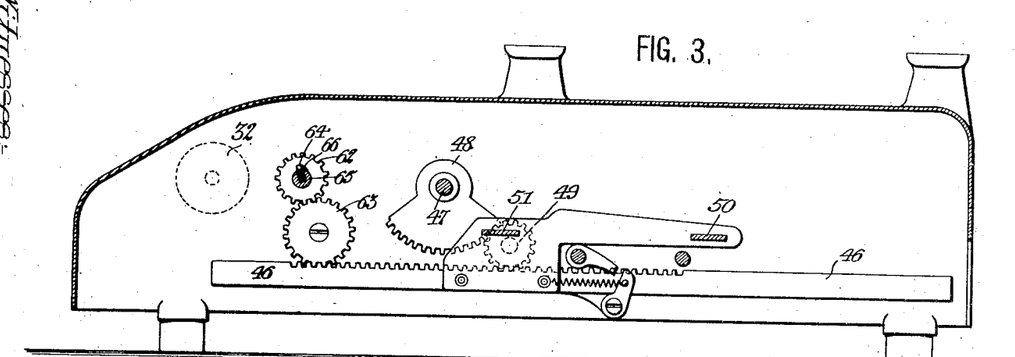
Fig. 3 is a sectional elevation from front to rear showing principally the general operator of the computing mechanism.

The pinion 56 having been moved by the tooth 55 to the position seen at Fig. 16 as the wheel 32 turned from "9" to "0," a broad tooth 59 upon said pinion is brought into the path of a segment or driving tooth 60 fixed upon a square shaft 61 operable by the general operator aforesaid, during the return stroke thereof, said shaft 61 being connected, as usual, by a pinion 62 and a driving gear 63 with the rack 46 of the general operator; a clutch being provided, as usual, to permit the segment shaft 61 to remain stationary during the forward movement of said general operator, and to revolve said shaft during the return movement of said general operator; said clutch being similar to the other clutches shown, and comprising a ball 64 pressed by a spring 65 into a recess 66 in the pinion 62, Fig. 3.

It will be understood that the starting teeth 55 on the computing wheels operate only during the forward stroke of the general operator, thereby starting the pinions 56 to positions to be engaged by the segments 60; and the latter are spirally placed upon the shaft 61, as seen best at Fig. 14, so that one tens-carrying train is fully operated before the pinion 56 of the succeeding tens-carrying train can be engaged or operated by the succeeding segment 60. Thus tens are carried from wheel to wheel along the set of wheels 32, independently of the wheels 33. It will be understood that, as usual, every third tooth of each pinion 56 is cut away or thinned as at 67, to permit the associated segment 60 to pass freely by said pinion when the latter is in normal position; the cutaway teeth being however thick enough to be engaged by the usual spring detent 68, Fig. 4. When any pinion 56 is actuated by its segment 60, it is brought to a position which is one-third of a revolution in advance of the position in which it originally stood and from which it was started by the tooth 55; the tens-carrying train hence moving a third of a revolution at each complete operation, to enable each of the three teeth 57 thereon to engage a gear 69 fixed on the next higher computing wheel 32, to rotate the same through one-tenth of a revolution; said teeth 57 in each instance moving into and out of the path of said gear 69.

For the computing wheels 33 there is provided an additional tens-carrying mechanism; each of said wheels 33 having a starting tooth 70 to engage any of the nine teeth on a pinion 71 to start the same to the position seen at Fig. 16, during the motion of the wheel 33 from "9" to "0". The tens-carrying train 56, etc., may be loosely mounted upon a fixed shaft 72 above the tens-carrying trains 71, etc., which may be loosely mounted upon a separate fixed shaft 73. The pinions 71 are similar to pinions 56, and are connected by long hubs 74 to three-toothed gears 75 similar to gears 57 and meshing with gears 76 fixed on wheels 33 and similar to gears 69. Hubs 74 are peripherally grooved at 78$^a$ to form rests for the racks 38, 39, Fig. 17.

By the movement of the starting tooth 70 and wheel 33 to the zero position at Fig. 16, the pinion 71 is rotated to bring a tooth 77 thereof into the path of a segment 78 also fixed on the square shaft 61, so that at the rotation of said shaft, the train 71, 75 may be operated to carry tens to the next higher computing wheel 33, whether the intervening computing wheel 32 is being operated by the tens-carrying mechanism or not.

The segments 78 have a spiral arrangement, (Fig. 15) similar to that of the segments 60, on the shaft 61, for the same purpose; and they alternate with or lie interjacent among the segments 60, as seen at Figs. 6 and 16, so that each of the segments 60 and 78 may register with its associated pinion 56 or 71. The segments 78 may have the same relation to the pinions 71 as the segments 60 have to the pinions 56; and since the pinions 71 are placed below the pinions 56 at Fig. 16, the segments 78 may be set below or back of the segments 60 at said figure, to give them the proper relationship to the pinions 71. It will thus be seen that the single power driven shaft 61 may operate a plurality of independent sets of trains of tens-carrying devices.

The dial wheels 32 may be reset to zero, while the dial wheels 33 remain stationary. There is provided, for this purpose, a zero key 79 of the usual type, to operate the usual lever 80, which, by means of a wrist or roll 81, lifts a bar 82, Fig. 5, said bar carrying a single pin 83, which encounters a fixture 84 during the upward movement of the bar 82, and is hence caused to project below said bar 82. When the bar drops, the projected pin 83 lies in the path of the cross bar 50 of the general operator, and at the next movement of the latter, said bar 82 is pushed forwardly; and a rack 85 thereon turns a pinion 86, which has a clutch connection 87$^x$, 88$^x$, 89$^x$, (Fig. 8) similar to that seen at 64, 65, 66, Fig. 3, with the arbor 34, so that the latter is rotated. Said arbor has means to connect it with all of the dial wheels 32 in one set, said connecting means comprising pockets 87 formed in said arbor, to receive balls 88 pressed outwardly from said pockets by springs 89, into recesses 90 usually formed in the hubs of wheels 32. This zero mechanism is similar to that shown in said Hart application, except that the pockets 87 are placed farther apart because of the intervention of the wheels 33 between the wheels 32; the wheels 33 not being clutched to arbor 34, and hence remaining stationary at the described operation of returning the wheels 32 to zero. The pocket 87 for the units wheel is placed in advance of the other pockets, as usual, for reasons set forth in said application, to start the tens-carrying train from the units wheel to the tens wheel; all the remaining wheels moving from "9" to "0" during the ensuing return stroke of the general operator.

Figure 4:
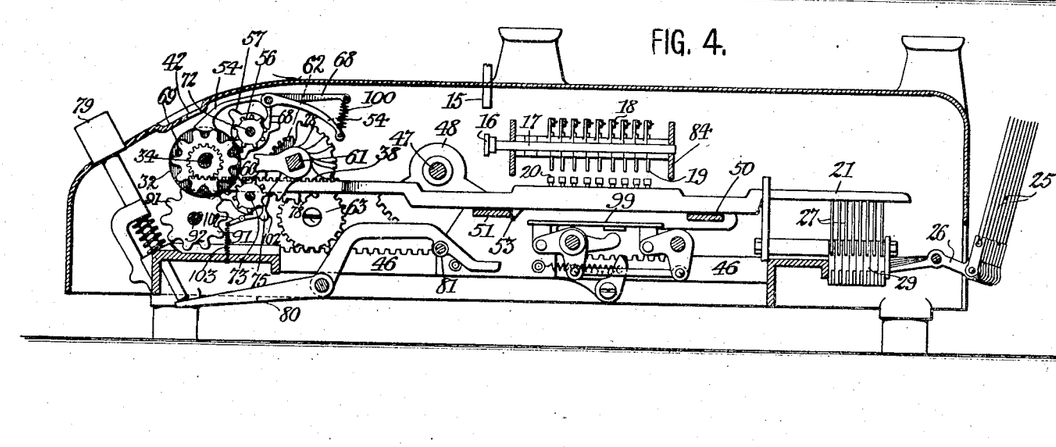
Fig. 4 is a sectional elevation from front to rear showing the computing wheels, tens carrying trains, pin-setting mechanism, etc.
Figure 5:
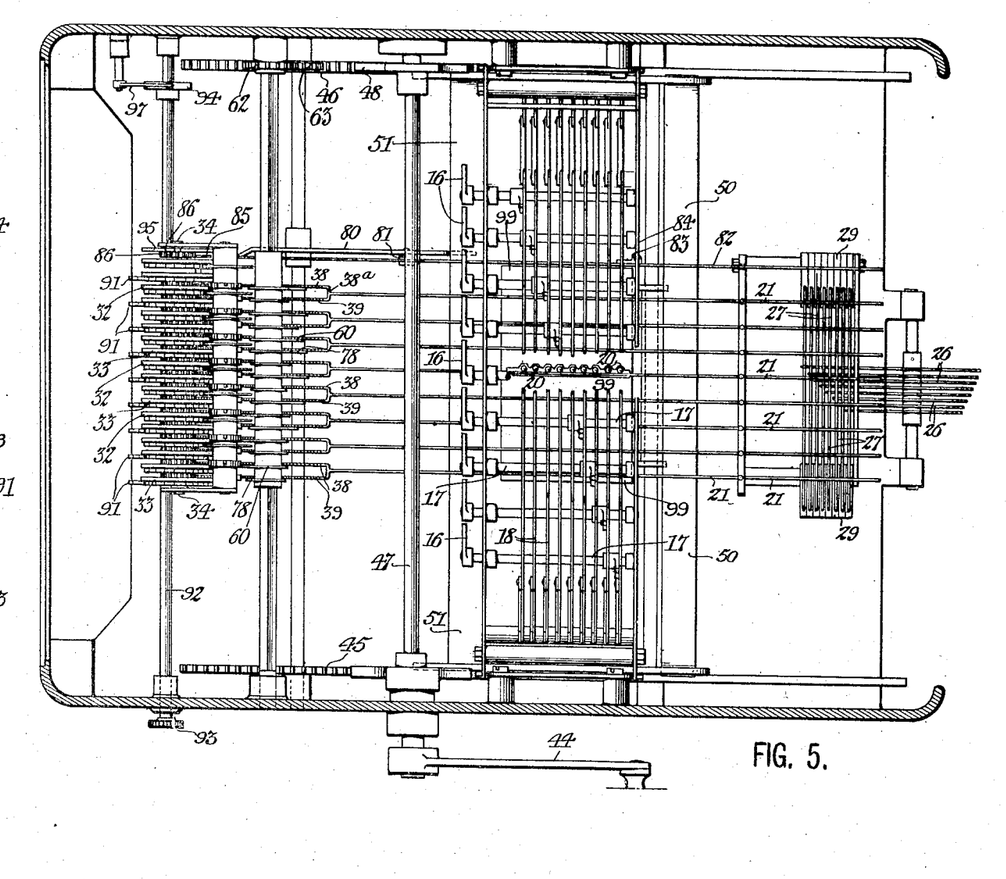
Fig. 5 is a sectional plan of the principal portions of the computing mechanism.
Figure 5A:
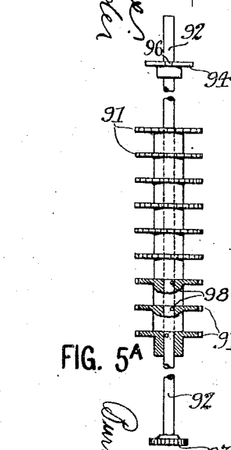

For returning the wheels 33 to zero, each of the gears 76 is provided with an idle gear 91 similar to gear 76, all the gears 91 mounted loosely on an arbor 92, Figs. 4 and 5$^a$, upon the end of which is fixed a thumb wheel or button 93, Figs. 5 and 5$^a$. Upon this arbor 92 is fixed a disk 94 similar to the disk 95 fixed on arbor 34, and having a similar notch 96 to receive a spring detent 97; said detents holding the arbors 34 and 92 in normal positions. At any time, by giving the button 93 a revolution, (to advance the wheels 33) and then operating the general operator handle 44, the wheels 33 may be set to zero. The arbor 92 has pockets 98 similar to the pockets of the arbor 34, and the units pocket is also in advance of the remaining pockets, so that the units dial wheel 33 is rotated to zero by the button 93, while all the other wheels 33 are rotated to "9"; and at the ensuing operation of the general operator 44, the tens carrying devices are called into action to advance all the higher wheels 33 to zero and clear the segments 78 from the pinions 71. It will be seen therefore that either set of wheels 33 or 32 may be turned to zero independently of the other set, and also that both sets may be returned concomitantly by first operating the button 93 and then depressing the zero key 79, and then reciprocating the crank 44.

The pins 20, after the completion of a computation, are lifted to normal positions by a horizontal plate 99, Figs. 4 and 5, which is similar to the corresponding plate, and operates in the same way, as set forth in said Hart application, but is made of greater width to accommodate the increase in width of the set of bars 21.

The detents 54 for the wheels 32 are connected by springs 100 to the detents 68 for the pinions 56, as set forth in said Hart application. The detents 54 for the wheels 76 are actuated by springs 101. Detents 102 having springs 103 are also provided for the pinions 71.

Figures 1, 2:
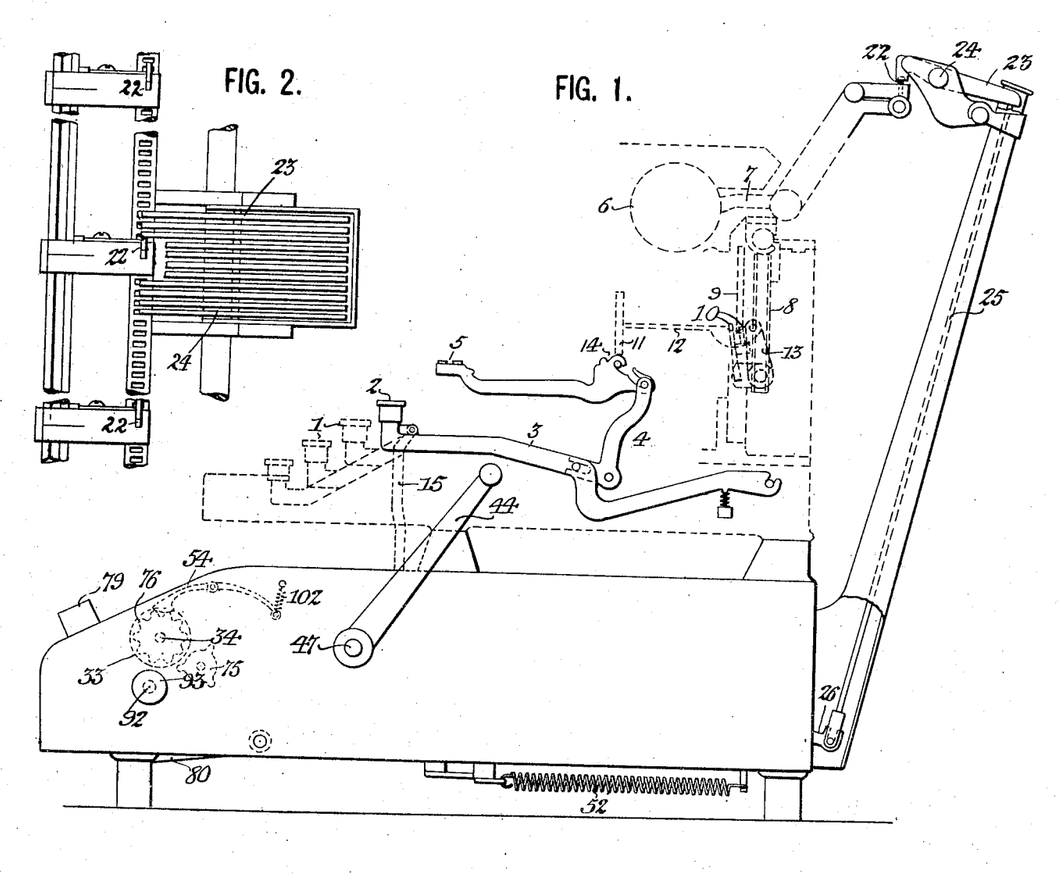
Figure 1 is a sectional elevation taken from front to rear of a combined typewriting and computing machine of the Underwood-Hanson type, illustrated in said patents and application.
Fig. 2 is a plan of a dog and jack mechanism, whereby the typewriter carriage takes part in the computing operation.

For cross adding, several of the adjustable dogs 22 may be provided as illustrated at Fig. 2; one dog for each written column. In writing a single line across the work sheet, numbers are written in the various columns, and as a number is being written in any column, its dog 22 acts successively upon the jacks 23, to determine the denomination with which computing shall be effected, or in other words, to select the dial wheel which has to be acted upon. At the conclusion of each line of writing, the sum of all the items written on said line appears upon one of the sets of computing wheels, for instance, upon the wheels 32. At the end of the first line of writing, the same number appears upon both sets 32 and 33. Then the wheels 32 may be returned to zero, without disturbing the wheels 33; the sum of the cross addition being written in the right hand margin of the work sheet. Then another line may be written, and the sum of the cross addition thereof placed under the first sum, the wheels 32 being again returned to zero; but the wheels 33 retain or show the grand total of all the items written in all the columns. It will be understood also that one totalizer, for instance, the totalizer 32, may be used for effecting vertical additions, and returned to zero from time to time, the grand total of all of said vertical additions being however accumulated upon the other totalizer 33. Other uses and advantages will be apparent to those familiar with the art.

Variations may be resorted to within the scope of the invention, and portions of the improvements may be used without others.

Having thus described my invention, I claim:—

1. In a computing machine, the combination with a plurality of sets of coaxial computing wheels, those in one set interjacent among those in another set, of means for positively operating wheels in said sets concomitantly.

2. In a computing machine, the combination with a plurality of sets of coaxial computing wheels, those in one set interjacent among those in another set, of means for positively operating wheels in said sets concomitantly, and means for setting all the wheels in one set to zero independently of the remaining wheels.

3. In a computing machine, the combination with a plurality of sets of coaxial computing wheels, those in one set interjacent among those in another set, of means for positively operating wheels in said sets concomitantly, and means for returning the wheels in each set to zero independent of the remaining wheels.

4. In a computing machine, the combination with a plurality of sets of coaxial computing wheels, those in one set interjacent among those in another set, of means for positively operating wheels in said sets concomitantly, and a cover having an individual sight opening for each of said wheels, said sight openings being so disposed so that the readings on one set of wheels can be taken independently of the readings on another set of wheels.

5. In a computing machine, the combination with a plurality of sets of computing wheels, those in one set interjacent among those in another set, of rack bars for operating said wheels, each rack bar being forked, and each fork having racks to operate wheels of similar denomination in different sets, an intermittent driver common to all of said wheels, and sets of tens-carrying devices ramifying from said common driver to said sets of wheels.

6. In a computing machine, the combination with a plurality of sets of computing wheels, those in one set interjacent among those in another set, of means to concomitantly operate wheels of similar denomination in different sets to the same extent, whereby the same numbers are carried into said sets of wheels concomitantly, and means for turning the wheels in one set to zero after a computation has been completed on the wheels in that set, independently of the remaining wheels, whereby the wheels in another of said sets may be caused to indicate the grand result of all the computations carried out on the wheels in the set so zeroized.

7. In a computing machine, the combination with a plurality of sets of computing wheels, those in one set interjacent among those in another set, of means for operating concomitantly wheels in both sets, a plurality of sets of tens-carrying devices, one set for each set of computing wheels, each set of tens-carrying devices including a pinion started by its associated computing wheel and means connected to said pinion to advance the computing wheel of next higher denomination in the same set, an intermittent power-driven driver, and two sets of segments or teeth connected to said driver to engage and drive the pinions in both of said sets of tens-carrying devices.

8. In a computing machine, the combination with a plurality of sets of computing wheels, those in one set interjacent among those in another set, of means for operating concomitantly wheels in both sets, a plurality of sets of tens-carrying devices, one set for each set of computing wheels, each set of tens-carrying devices including a pinion started by its associated computing wheel and means connected to said pinion to advance the computing wheel of next higher denomination in the same set, an intermittently rotating power-driven shaft, and a plurality of sets of pinion-driving segments or teeth thereon, one for each set of pinions, the segments or teeth in one set interjacent among those in another set.

9. In a computing machine, the combination with a plurality of sets of computing wheels, those in one set interjacent among those in another set, of means for operating concomitantly wheels in both sets, a plurality of sets of tens-carrying devices, one set for each set of computing wheels, each set of tens-carrying devices including a pinion started by its associated computing wheel and means connected to said pinion to advance the computing wheel of next higher denomination in the same set, an intermittently rotating power-driven shaft, and a plurality of sets of pinion-driving segments or teeth thereon, one for each set of pinions, the pinions in one set being eccentrically disposed to those in another set, and the sets of segments or teeth being correspondingly placed on said shaft.

10. In a computing machine, the combination with a plurality of sets of coaxial computing wheels, those in one set interjacent among those in another set, of a general operator for turning all the wheels concomitantly, devices for determining the extent of rotation of the wheels, and means to cause said general operator to turn all the wheels in one set to zero at will while the wheels in another set remain stationary.

11. In a computing machine, the combination with a plurality of sets of coaxial computing wheels, those in one set interjacent among those in another set, of a general operator for turning all the wheels concomitantly, devices for determining the extent of rotation of the wheels, means to cause said general operator to turn all the wheels in one set to zero at will while the wheels in another set remain stationary, and means for independently returning to zero the wheels in said other set.

12. In a computing machine, the combination with an arbor, of a plurality of sets of computing wheels thereon, those in one set interjacent among those in another set, means for turning the wheels, clutch connections between said arbor and the wheels in one of said sets, and means for revolving said arbor to turn the wheels in said set to zero while said other wheels remain stationary.

13. In a computing machine, the combination with an arbor, of a plurality of sets of computing wheels thereon, those in one set interjacent among those in another set, means for turning the wheels, clutch connections between said arbor and the wheels in one of said sets, means for revolving said arbor to turn the wheels in said set to zero while said other wheels remain stationary, and means for independently turning to zero said other set of computing wheels.

14. In a computing machine, the combination with an arbor, of a plurality of sets of computing wheels thereon, those in one set interjacent among those in another set, means for turning the wheels, clutch connections between said arbor and the wheels in one of said sets, means for revolving said arbor to turn the wheels in said set to zero while said other wheels remain stationary, pinions geared to said other wheels, and means operable through said pinions for turning to zero said other wheels while the wheels in the first set remain stationary.

15. In a computing machine, the combination with an arbor, of a plurality of sets of computing wheels thereon, those in one set interjacent among those in another set, means for turning the wheels, clutch connections between said arbor and the wheels in one of said sets, means for revolving said arbor to turn the wheels in said set to zero while said other wheels remain stationary, pinions geared to said other wheels, an arbor having clutch connections to said pinions, and means for rotating said arbor to turn said other wheels to zero independently of the wheels in the first set.

16. The combination of sets of computing wheels coaxially disposed, the wheels in one set interjacent among those of the other set, a set of tens-carrying devices extending from wheel to wheel of one of said sets past the wheels of the other of said sets, and a second set of tens-carrying devices mounted eccentrically of the first and extending from wheel to wheel in the other set of computing wheels.

17. The combination of sets of computing wheels coaxially disposed, the wheels in one set interjacent among those of the other set, a set of tens-carrying devices extending from wheel to wheel of one of said sets past the wheels of the other of said sets, a second set of tens-carrying devices mounted eccentrically of the first and extending from wheel to wheel in the other set of computing wheels; each of said computing wheels having a pinion, and a set of operating bars for all of said pinions; each bar having racks to engage two pinions, one in each computing wheel set.

18. The combination of sets of computing wheels coaxially disposed, the wheels in one set interjacent among those of the other set, a set of tens-carrying devices extending from wheel to wheel of one of said sets past the wheels of the other of said sets, a second set of tens-carrying devices mounted eccentrically of the first and extending from wheel to wheel in the other set of computing wheels; each of said computing wheels having a pinion, and a set of operating bars for all of said pinions; each bar having racks to engage two pinions, one in each computing wheel set; and a clutch connecting each of said pinions to its associated computing wheel.

19. A power-driven intermittent tens-carrying driver having a plurality of complete sets of segments or teeth thereon, those in one set interjacent between those in another set.

20. The combination of a plurality of sets of computing wheels; a single set of driving means therefor arranged to concomitantly operate wheels of the same denomination in different sets; key-controlled means or devices for governing the extent of movement of the wheels so operated; a driver for said wheel-driving means; and a plurality of sets of individual tens-carrying trains operable by said driver, one set of trains for each set of computing wheels, each computing wheel having a starting tooth for its tens-carrying train.

21. The combination with a single system of key-set pins, of a plurality of totalizers, and means coöperating with said pins for cross-adding on one totalizer and simultaneously accumulating on another totalizer the sum or product of the successive cross-additions.

22. A power-driven intermittent tens-carrying driver having a plurality of complete sets of segments or teeth thereon, the segments on one set lying in a territory overlapping the territory of another set.

23. The combination with a plurality of sets of computing wheels, of a single set of multiple racks having a plurality of sets of teeth facing in the same direction and arranged to actuate all of the sets of computing wheels, said computing wheels engaging said racks from the same side.

24. The combination with a plurality of sets of computing wheels, of a plurality of multiple racks for actuating all of said sets of computing wheels simultaneously for corresponding wheels in the several sets.

25. The combination with a plurality of totalizers, of a single means for first indexing individually each group of digits corresponding to a number to be computed, and single acting transferring means for subsequently running up on a plurality of said totalizers at the same time each successive group of digits indexed by said indexing means in a manner to afford different results at the same time on the several totalizers actuated.

26. The combination with a plurality of sets of computing wheels, the computing wheels of one set encroaching on the included space occupied by the computing wheels of another set, the wheels of one set being grouped with other wheels to accord with common denominations, of means individual to each denominational group arranged to simultaneously actuate all of the wheels in the corresponding group.

27. In a computing machine, the combination of a plurality of sets of computing wheels, corresponding wheels in said sets acting in groups of accordant denominations; means individual to each denominational group arranged to simultaneously actuate all of the wheels in the corresponding group; a set of carry-over devices for each set of wheels; and a driving element common to all of said sets of carry-over devices.

28. In a computing machine, a rack forked at one end and unitary at the other end, with two sets of teeth on the forked end of the rack facing in but one direction, for simultaneously actuating a pair of computing wheels.

29. The combination with a plurality of computing heads each having a set of computing wheels, the computing wheels of one head being interspersed between the other computing wheels, and the computing wheels of one set lying next adjacent the computing wheels between which they are interspersed, of means for rotating all said computing wheels at the same time to run up computations.

30. The combination with a plurality of computing heads each having a set of computing wheels, the computing wheels of one head being interspersed between the other computing wheels, and the computing wheels of one set lying next adjacent the computing wheels between which they are interspersed, of means for yoking computing wheels of the same denomination for rotating the same at the same time to run up a computation in a plurality of said computing heads.

31. The combination with a plurality of computing heads each having a set of computing wheels, the computing wheels on one head being interspersed between the other computing wheels, and the computing wheels of one set lying next adjacent the computing wheels between which they are interspersed, of tangentially-acting means for engaging the peripheries of said computing wheels, said tangentially acting means being united in units at a point remote from the computing wheels, to rotate in unison computing wheels of the same denominations for the purpose of running up the same computations thereon in all of said computing heads.

32. The combination with a plurality of sets of computing wheels, the computing wheels of one set being interspersed between the other computing wheels, of a set of carry-over devices for each set of computing wheels, the carry-over devices associated with one set of wheels bridging the other computing wheels to skip the same.

33. The combination with a plurality of coaxially-arranged computing wheels, of a set of multiple racks for said wheels forked axially so that each rack may actuate a plurality of said coaxially-arranged computing wheels.

34. The combination with a plurality of coaxial sets of computing wheels, of a multiple carry-over mechanism for said computing wheels, including a plurality of sets of complete carry-over entireties, said sets of carry-over entireties being arranged eccentric to one another, and a common driving means for all of said entireties, said common driving means having coaxially arranged elements corresponding to each of said computing wheels.

35. The combination with a plurality of interjacent computing wheels, of a single denominational member for simultaneously actuating a plurality of said wheels.

36. In a combined typewriting and computing machine, the combination with a plurality of sets of interjacent computing wheels, of a single denomination member for concomitantly actuating a certain definite plurality of wheels located in different sets to the exclusion of others of said wheels, means for operating said member, means for determining the extent of such operation, and a carriage connected to render said member effective with relation to the last-named means during the movement of said carriage.

37. The combination with a plurality of interjacent computing wheels, of multiple rack bars for actuating said computing wheels, each rack bar being arranged to concomitantly rotate more than one of said wheels, devices settable to determine the extent of movement of said bars, and keys for setting said devices.

38. The combination with a plurality of sets of computing wheels, of a single set of multiple rack bars for actuating all of said sets of computing wheels concomitantly, devices settable to determine the extent of movement of said rack bars, and keys for setting said devices.

39. The combination with a plurality of sets of computing wheels, the wheels of the different sets being located interjacent each other, of actuating means exterior to said computing wheels for running up numbers on said computing wheels, said actuating means having elements common to a plurality of said wheels in different sets, so that said individual elements of said actuating means can concomitantly rotate the wheels of more than one set.

40. The combination with a plurality of sets of computing wheels, the wheels of the different sets encroaching on the included space occupied by the wheels of each other, the wheels of the different sets being also independent of the status of the wheels to each other but grouped with accordant wheels, so as to correspond to the same denominations, of actuating means common to all sets for rotating the wheels to accumulate computations, said actuating means having elements arranged to individually rotate wheels in a plurality of different sets at the same time.

41. The combination with a plurality of sets of computing wheels, of a carry-over mechanism including a plurality of sets of segments, one set of segments individual to each set of computing wheels, and a shaft whereon all of said segments are mounted, the segments of one set being interspersed between the other segments.

42. The combination with a plurality of sets of computing wheels, of a carry-over mechanism including a plurality of sets of segments, one set of segments individual to each set of computing wheels, and a shaft whereon all of said segments are mounted, the segments of one set being off-set circumferentially from the segments of another set.

43. The combination with a plurality of sets of computing wheels, of a carry-over mechanism including a plurality of sets of segments, one set of segments individual to each set of computing wheels, and a shaft whereon all of said segments are mounted, the segments of one set being located interjacent among the other segments, and the corresponding segments of the different sets having different radial positions on said shaft.

44. The combination with a series of computing wheels arranged in a plurality of sets, each set corresponding to a computing head, the computing wheels of one set being interspersed among the remaining computing wheels, of a single set of members for determining the extent of rotation of all said sets of computing wheels, said members being unitary at one end and multiple at the other end, so that each engages and operates a plurality of said computing wheels.

45. The combination with a plurality of computing heads, each comprising a plurality of computing wheels corresponding to different denominations, of a series of denominational members, one for each denomination, said denominational members each having a plurality of racks, one for each computing head, whereby each denominational member may control the rotation of a plurality of said wheels, the wheels of the different computing heads being interjacent and said denominational members being spread apart to accommodate the overlapping of territory of the computing heads.

46. The combination with a plurality of computing heads concentrated so that the territory of one overlaps the territory of another, of tens-carrying mechanism individual to each head coöperating with the corresponding heads from different directions, and assisting or boosting mechanism for all of said tens-carrying mechanisms concentrated so that the assisting or boosting mechanism for one tens-carrying mechanism overlaps the territory of the assisting or boosting mechanism for another tens-carrying mechanism.

47. The combination with a shaft, of a plurality of computing heads mounted on the same shaft, tens-carrying mechanism for each computing head, said tens-carrying mechanisms being offset from each other, so as to aid corresponding heads from different points, and a boosting or assisting mechanism for all of said tens-carrying mechanisms mounted to rotate about the same axis.

48. The combination with a plurality of computing heads, each including a series of computing wheels, of a tens-carrying mechanism individual to each of said computing heads, said tens-carrying mechanisms being offset vertically, a boosting or assisting mechanism common to all of said tens-carrying mechanisms, and a general operator for rotating said computing wheels and for actuating said boosting or assisting mechanism.

49. The combination with a plurality of computing heads, each including a series of computing wheels, of a separate tens-carrying mechanism for each of said computing heads, said tens-carrying mechanisms being offset vertically, an assisting or boosting device common to all of said tens-carrying mechanisms, and a general operator for rotating the computing wheels of all of said computing heads concomitantly during each stroke of said general operator in one direction and for rotating said assisting or boosting device to actuate all of said tens-carrying mechanisms during each stroke of said general operator in the opposite direction.

50. The combination of a plurality of coaxial sets of computing wheels, means for concurrently actuating wheels of similar denomination in different sets, a multiple carry-over mechanism for said computing wheels including a plurality of sets of complete carry-over entireties, said sets of carry-over entireties being arranged eccentric to one another, and a common driving means for all of said entireties, said common driving means having co-axially arranged elements corresponding to each of said computing wheels.

51. In a computing machine, the combination with a plurality of sets of computing wheels, those in one set interjacent among those in another set; of rack bars for operating said wheels, each rack bar being forked, and each fork having racks to operate wheels of similar denominations in different sets; and driving means common to all of said racks.

52. The combination, with a plurality of computing heads, each comprising a set of computing wheels and a power-driven tens-carrying mechanism therefor; of a single set of actuating members for concurrently rotating all of said wheels in the same direction during each movement of said members in one direction, each member arranged to concurrently rotate all of the wheels of the same denomination at such time; differential means associated with said actuating members for controlling the extent of movement thereof, whereby at each computation the same number is run at the same time into all of said heads; and common driving means for said actuating members and said tens-carrying mechanisms.

BURNHAM C. STICKNEY.

Witnesses:
K. FRANKFORT,
C. RIPLEY.

Copies of this patent may be obtained for five cents each, by addressing the "Commissioner of Patents, Washington, D. C."